H. ESKETT.
MACHINE FOR DIGGING POTATOES.
APPLICATION FILED FEB. 28, 1914.
1,157,931.
Patented Oct. 26, 1915.
2 SHEETS—SHEET 1.
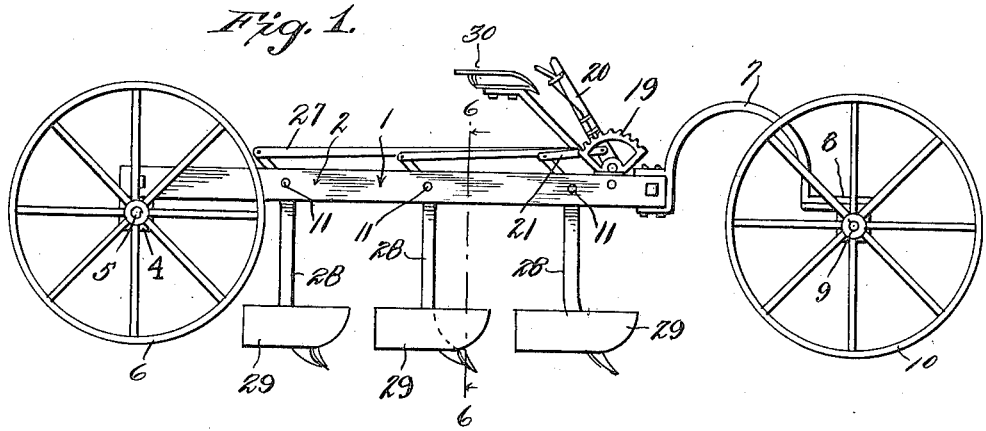
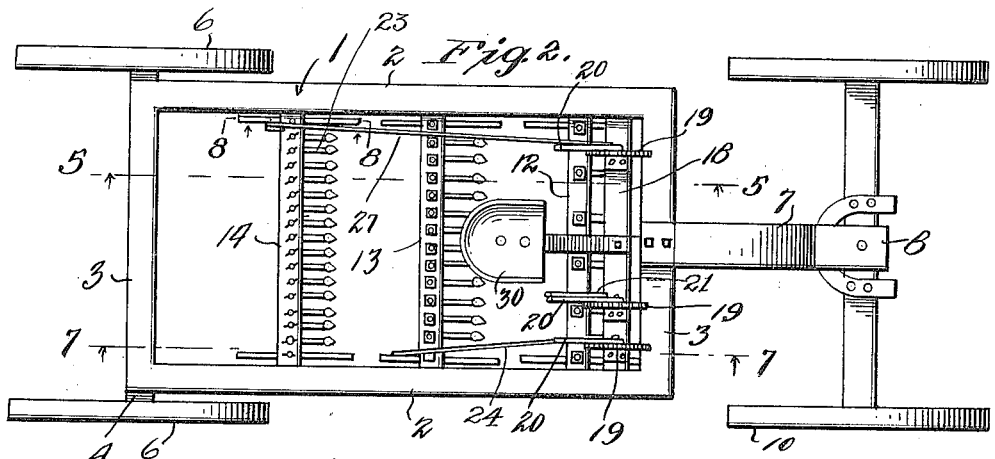
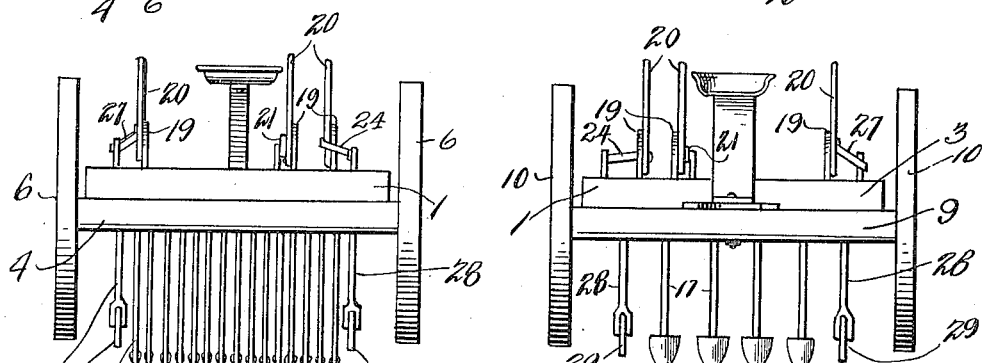
Inventor
H. Eskett

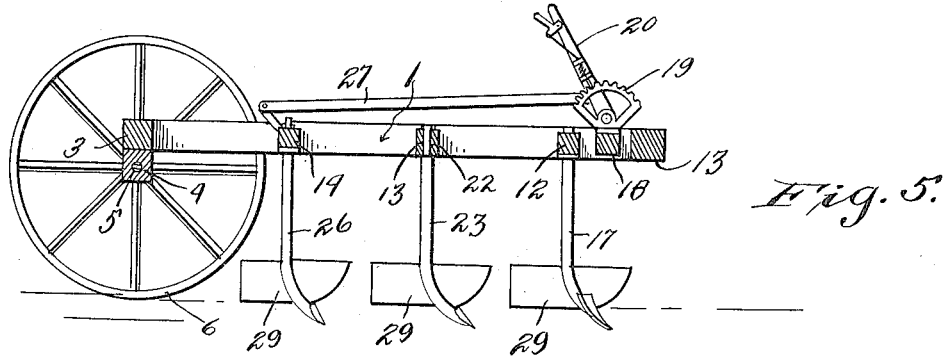
Fig. 5.
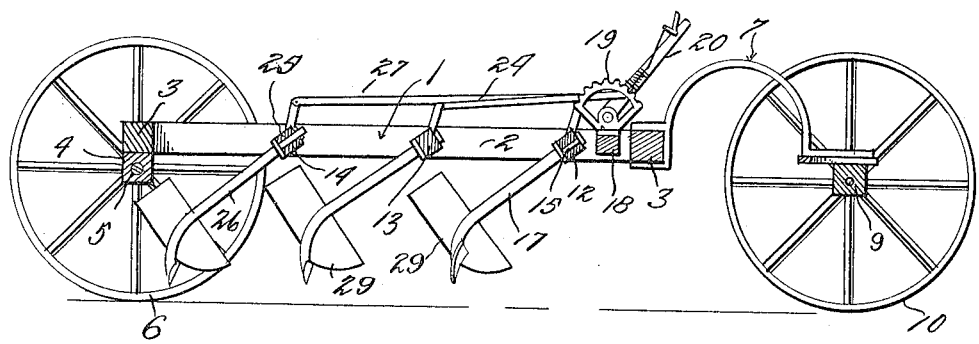
Fig. 7.
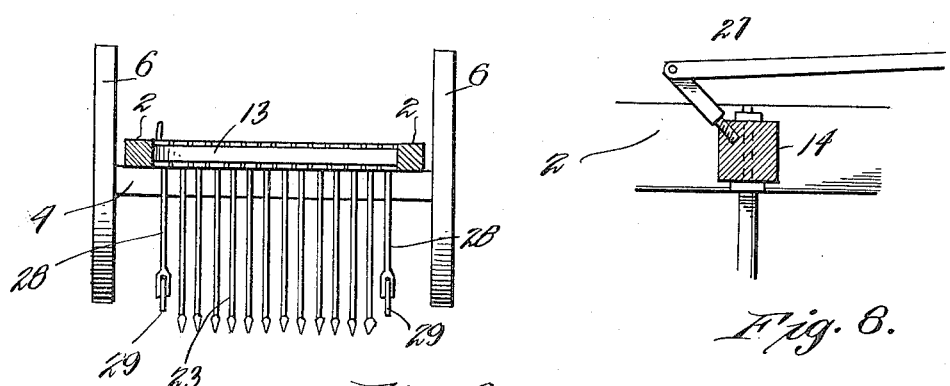
Fig. 6.
Fig. 8.

UNITED STATES PATENT OFFICE.

HENRY ESKETT, OF MOUNDS, ILLINOIS, ASSIGNOR OF ONE-HALF TO VIRGINIA HYNDS, OF MOUNDS, ILLINOIS.

MACHINE FOR DIGGING POTATOES.

1,157,931.     Specification of Letters Patent.     Patented Oct. 26, 1915.

Application filed February 28, 1914. Serial No. 821,656.

*To all whom it may concern:*

Be it known that I, HENRY ESKETT, a citizen of the United States, residing at Mounds, in the county of Pulaski, State of Illinois, have invented certain new and useful Improvements in Machines for Digging Potatoes; and I do hereby declare the following to be a full, clear, and exact description of the invention, such as will enable others skilled in the art to which it appertains to make and use the same.

The present invention is directed to machines for digging potatoes, and has for its object to so construct a machine of this character that the same will when being moved across the field dig the potatoes and separate the same in piles, each pile consisting of potatoes of different sizes.

A still further object of the invention is to provide a machine of this character such that the operator can upon operating levers pile the potatoes in piles containing potatoes of different sizes.

With these and other objects in view, this invention resides in the novel features of construction, formation, combination and arrangement of parts to be hereinafter more fully described, claimed and illustrated in the accompanying drawing, in which:—

Figure 1 is a side elevation of the machine. Fig. 2 is a top plan view. Fig. 3 is a rear view. Fig. 4 is a front view. Fig. 5 is a sectional view on line 5—5 of Fig. 2. Fig. 6 is a similar view on line 6—6 of Fig. 1. Fig. 7 is a similar view on line 7—7 of Fig. 2, showing the separating teeth elevated. Fig. 8 is a sectional view on line 8—8 of Fig. 2.

Referring to the drawing, the numeral 1 designates the frame, which consists of side bars 2 and end bars 3, the rear end bar 3 having fixed thereto a bolster 4 which supports the rear axle 5, said axle being provided with wheels 6.

Fixed to the upper surface of the forward end bar 3 is an arch bar 7, which has its forward end terminating in a horizontal plate 8 which is pivotally connected to the front axle 9, said axle being provided with wheels 10, which serve in conjunction with the wheels 6 to properly support the frame.

Having their trunnions 11 journaled in the side bars 2 are the shafts 12, 13 and 14, said shafts being rectangular in cross section. The shaft 12 is provided with a plurality of sockets 15 in which are fixed the shanks of the plow standards 17 which serve to dig the potatoes during the movement of the machine forwardly.

Supported transversely of the frame is a bar 18 upon which are supported the segments 19, and operating in connection therewith are the hand levers 20, one of the hand levers 20 being connected to the shaft 12 by the link 21 so that when the lever is rocked in one direction the shaft will be rotated sufficiently to elevate the plow standards to free the potatoes which have been caught by the standards. The shaft 13 is also provided with sockets 22, which are greater in number than the sockets 15 of the shaft 12 and serve to secure the teeth 23 to said shaft, said teeth serving to catch potatoes of medium size. The shaft 13 is rotated through the medium of the link 24 which is connected to one of the levers 20.

The shaft 14 is provided with a plurality of sockets 25 which are engaged by the teeth 26, the number of teeth 26 being greater in number than the teeth 25 so that potatoes which may pass between the teeth 23 will be caught by the teeth 26. The shaft 14 is rotated so as to free the potatoes through the medium of the link 27 which has its forward end connected to one of the hand levers 20.

Each shaft has fixed to its ends arms 28, the lower ends of which are provided with fenders 29 which serve to prevent the potatoes from rolling laterally.

Supported by the bar 18 is a seat 30, which is disposed so that the occupant thereof can readily control the levers 20 so as to successively rotate the bars 12, 13 and 14 so that the potatoes can be piled in rows, after being assorted.

From the foregoing description it is obvious that the machine can be used with equal success for digging and assorting vegetables other than potatoes, and that further that the same could be used for cultivating or removing vines, stalks or the like from a field.

What is claimed is:—

1. A machine of the class described comprising a frame, a plurality of shafts rotatably supported by the frame, one of said shafts having plow standards connected thereto, the other shafts having teeth carried thereby for digging and assorting potatoes, and means for rocking the shafts independently.

2. A machine of the class described comprising a frame, a plurality of shafts journaled transversely of the frame, plow standards connected to the forward shaft, teeth connected to the rear and intermediate shaft, the teeth carried by the rear shaft being greater in number than those carried by the intermediate shaft, and means for rocking the shafts to lift the standards and teeth.

3. A machine of the class described comprising a frame, shafts journaled transversely of the frame, plow standards fixed to the forward shaft, teeth fixed to the rear and intermediate shaft, the teeth of the rear shaft being greater in number than the teeth of the intermediate shaft, and standards of the forward shaft, arms depending from the shafts, fenders fixed to the lower ends of the arms, and means for independently rocking the shafts to lift the teeth and plow standards and fenders, as and for the purpose set forth.

In testimony whereof, I affix my signature, in the presence of two witnesses.

HENRY ESKETT.

Witnesses:
E. A. RHEA,
JOHN T. GOURLEY.

Copies of this patent may be obtained for five cents each, by addressing the "Commissioner of Patents, Washington, D. C."